(12) United States Patent
Miller et al.

(10) Patent No.: US 10,415,127 B2
(45) Date of Patent: Sep. 17, 2019

(54) TURBOMACHINE COMPONENTS MANUFACTURED WITH CARBON NANOTUBE COMPOSITES

(71) Applicants: Harry F. Miller, Allegany, NY (US); H. Allan Kidd, Vero Beach, FL (US)

(72) Inventors: Harry F. Miller, Allegany, NY (US); H. Allan Kidd, Vero Beach, FL (US)

(73) Assignee: DRESSER-RAND COMPANY, Olean, NY (US)

( * ) Notice: Subject to any disclaimer, the term of this patent is extended or adjusted under 35 U.S.C. 154(b) by 675 days.

(21) Appl. No.: 14/917,106

(22) PCT Filed: Aug. 11, 2014

(86) PCT No.: PCT/US2014/050515
§ 371 (c)(1),
(2) Date: Mar. 7, 2016

(87) PCT Pub. No.: WO2015/034628
PCT Pub. Date: Mar. 12, 2015

(65) Prior Publication Data
US 2016/0208367 A1    Jul. 21, 2016

Related U.S. Application Data

(60) Provisional application No. 61/873,989, filed on Sep. 5, 2013.

(51) Int. Cl.
*C22C 49/14* (2006.01)
*C08K 7/24* (2006.01)
(Continued)

(52) U.S. Cl.
CPC .............. *C22C 49/14* (2013.01); *B22D 19/14* (2013.01); *B22D 25/06* (2013.01); *B22D 27/11* (2013.01);
(Continued)

(58) Field of Classification Search
CPC ........ B22D 25/06; B22D 27/15; B22D 27/11; B22D 19/14; C22C 49/11; C22C 49/08;
(Continued)

(56) References Cited

U.S. PATENT DOCUMENTS

2008/0093577 A1    4/2008  Khraishi et al.
2010/0015002 A1*   1/2010  Barrera ................. B82Y 30/00
                                             419/11
(Continued)

FOREIGN PATENT DOCUMENTS

KR    20060118681 A    11/2006
KR    20100024230 A     3/2010
(Continued)

OTHER PUBLICATIONS

Machine Translation of WO 2011/161294 to Consejo Superior de Ivestigaciones Cientificas (Year: 2011).*

(Continued)

*Primary Examiner* — Daniel C. McCracken

(57) ABSTRACT

A turbomachine component and method for fabricating the turbomachine component are provided. The turbomachine component may include a matrix material and carbon nanotubes combined with the matrix material. The matrix material may include a metal or a polymer. The carbon nanotubes may be contacted with the metal to form a metal-based carbon nanotube composite, and the metal-based carbon nanotube composite may be processed to fabricate the turbomachine component.

8 Claims, 1 Drawing Sheet

(51) Int. Cl.
| | |
|---|---|
| *B22D 25/06* | (2006.01) |
| *B22D 27/11* | (2006.01) |
| *B22D 27/15* | (2006.01) |
| *C22C 47/08* | (2006.01) |
| *C22C 47/14* | (2006.01) |
| *C22C 49/06* | (2006.01) |
| *C22C 49/08* | (2006.01) |
| *C22C 49/11* | (2006.01) |
| *B22F 5/00* | (2006.01) |
| *B22F 5/04* | (2006.01) |
| *C22C 1/10* | (2006.01) |
| *C22C 26/00* | (2006.01) |
| *B22D 19/14* | (2006.01) |
| *C01B 32/168* | (2017.01) |

(52) U.S. Cl.
CPC .............. *B22D 27/15* (2013.01); *B22F 5/009* (2013.01); *B22F 5/04* (2013.01); *C01B 32/168* (2017.08); *C08K 7/24* (2013.01); *C22C 1/1036* (2013.01); *C22C 26/00* (2013.01); *C22C 47/08* (2013.01); *C22C 47/14* (2013.01); *C22C 49/06* (2013.01); *C22C 49/08* (2013.01); *C22C 49/11* (2013.01); *B22F 2998/10* (2013.01); *C08K 2201/011* (2013.01); *C22C 2026/002* (2013.01)

(58) Field of Classification Search
CPC ......... C22C 49/06; C22C 49/14; C22C 47/08; C22C 47/14; C22C 1/1036; C22C 26/00; C22C 2026/002; C01B 32/168; C08K 7/24; C08K 2201/011; B22F 5/009; B22F 5/04; B22F 2998/10; B22F 1/0059; B22F 3/02; B22F 3/10
See application file for complete search history.

(56) References Cited

U.S. PATENT DOCUMENTS

| | | | |
|---|---|---|---|
| 2011/0020134 A1* | 1/2011 | Jensen | B82Y 30/00 416/241 R |
| 2016/0074934 A1* | 3/2016 | Pillon | C22C 47/08 164/498 |

FOREIGN PATENT DOCUMENTS

| | | | |
|---|---|---|---|
| KR | 20110130400 A | 12/2011 | |
| KR | 20120001890 A | 1/2012 | |
| WO | 2009080048 A1 | 7/2009 | |
| WO | 2011078934 A1 | 6/2011 | |
| WO | WO 2011/161294 | * 12/2011 | ........... C08G 65/321 |

OTHER PUBLICATIONS

U.S. Appl. No. 61/821,305, filed May 9, 2013. (Year: 2013).*
PCT International Search Report and Written Opinion dated Nov. 10, 2014 corresponding to PCT Application PCT/US2014/050515 filed Aug. 11, 2014.

* cited by examiner

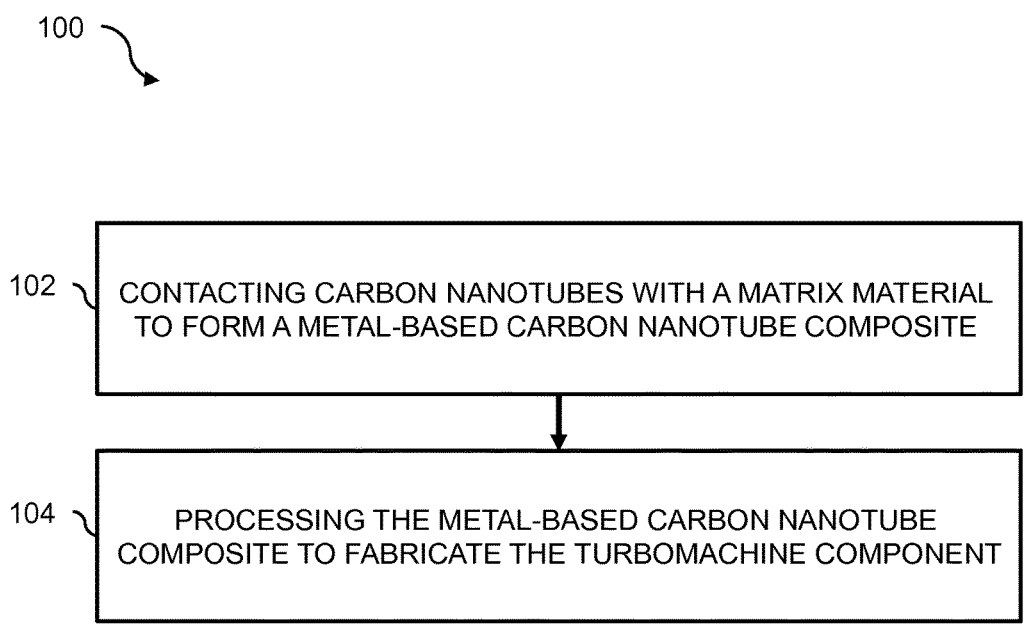

TURBOMACHINE COMPONENTS MANUFACTURED WITH CARBON NANOTUBE COMPOSITES

CROSS-REFERENCE TO RELATED APPLICATIONS

The present application is a national stage application of PCT Pat. App. No. PCT/US2014/050515, filed Aug. 11, 2014, which claims priority to U.S. Provisional Patent Application having Ser. No. 61/873,989, which was filed Sep. 5, 2013. These priority applications are hereby incorporated by reference in their entirety into the present application, to the extent that they are not inconsistent with the present application.

BACKGROUND

Conventional turbomachines, such as turbines, compressors, and compact motor-compressors, are often utilized in a myriad of applications and industrial processes that expose the turbomachines and/or components thereof to extreme operating conditions (e.g., high temperatures and mechanical stress). Accordingly, the turbomachines and/or components thereof are often fabricated from materials, such as metals and alloys, which provide the required strength and stiffness to endure these extreme operation conditions. For example, conventional turbomachines and/or components thereof are often fabricated from carbon and stainless steels, which provide high tensile strength, ductility, and stiffness.

As advancements are made in these industrial processes, however, production requirements for the turbomachines are often heightened. In many cases, to meet the heightened production requirements, the size or dimensions of the turbomachines and/or components thereof are often increased. Increasing the size of the turbomachines and/or components thereof, however, results in a corresponding increase in mass due to the high density of the metals and alloys, which may be detrimental to efficient operation and production of the turbomachines. The effects of the increased mass may be exacerbated in turbomachines installed offshore. Additionally, increasing production may require subjecting the turbomachines and/or components thereof to increased operating temperatures and/or mechanical stresses. Accordingly, the materials used to fabricate the turbomachines and/or components thereof must be capable of enduring the increased temperatures and/or mechanical stresses.

In view of the foregoing, attempts have been made to discover or create lightweight materials having properties (e.g., strength and/or stiffness) that meet or exceed those utilized in the fabrication of the conventional turbomachines and/or components thereof (e.g., carbon and stainless steel). These attempts have resulted in the development of various composites and/or alloys, such as metal matrix composites. Metal matrix composites may include a metal matrix having one or more reinforcing materials dispersed therein. The properties of the metal matrix composites may be tailored by modifying the metal matrix and/or the reinforcing materials. For example, to fabricate a metal matrix composite having a low density and high strength, a low density metal, such as aluminum, may be combined with a high strength reinforcing material, such as carbon fibers. Recently, attempts have been made to utilize carbon nanotubes as the reinforcing material, due to the improved mechanical properties they exhibit over other materials, such as carbon fibers. In addition to the metal matrix composites incorporating the carbon nanotubes, attempts have also been made to create polymeric composite materials incorporating the carbon nanotubes. The majority of the attempts to incorporate the carbon nanotubes, however, have not been successful or have resulted in composite materials with properties that are inadequate for the manufacture of turbomachines and/or components thereof. Additionally, the utilization of these materials in the manufacture of the turbomachines and/or components thereof has not been successful. For example, the utilization of these carbon nanotube composite materials has not been successfully scaled for the large-scale manufacture of turbomachines and/or components thereof.

What is needed, then, are systems and methods for fabricating carbon nanotube composite materials that exhibit properties adequate for industrial, large-scale manufacture of turbomachines and/or components thereof.

SUMMARY

Embodiments of the disclosure may provide a turbomachine component including a matrix material and carbon nanotubes combined with the matrix material. The matrix material may include a metal.

Embodiments of the disclosure may also provide a turbomachine component including a matrix material and carbon nanotubes combined with the matrix material. The matrix material may include a polymer.

Embodiments of the disclosure may further provide a method for fabricating a turbomachine component. The method may include contacting carbon nanotubes with a matrix material to form a metal-based carbon nanotube composite, and processing the metal-based carbon nanotube composite to fabricate the turbomachine component.

BRIEF DESCRIPTION OF THE DRAWING

The present disclosure is best understood from the following detailed description when read with the accompanying FIGURE. It is emphasized that, in accordance with the standard practice in the industry, various features are not drawn to scale. In fact, the dimensions of the various features may be arbitrarily increased or reduced for clarity of discussion.

The FIGURE illustrates a flowchart of a method for fabricating a turbomachine component, according to one or more embodiments disclosed.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments provided herein. This repetition is for the purpose of simplicity and clarity and does not in itself dictate a relationship between the various exemplary embodiments and/or configurations discussed in the FIGURE. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Carbon nanotube composites may include one or more matrix materials having carbon nanotubes combined therewith. In at least one embodiment, the carbon nanotubes may be combined with the matrix material to control or modify one or more properties of the resulting carbon nanotube composites. Illustrative properties of the carbon nanotube composites that may be modified by the combination of the carbon nanotubes with the matrix material may include, but are not limited to, mass, density, volume, tensile strength, flexibility, elasticity, thermal conductivity, thermal expansion coefficient, wear resistance, hydrophobicity, surface friction, or any combination thereof. In another embodiment, a concentration of the carbon nanotubes and/or the matrix materials may be varied to control or modify the properties of the resulting carbon nanotube composites. For example, the concentration of the carbon nanotubes may be increased to increase the tensile strength of the resulting carbon nanotube composites.

The carbon nanotubes may include carbon-based molecules having a generally elongated, hollow, tubular structure. In at least one embodiment, the hollow, tubular structure of the carbon nanotubes may be formed from two-dimensional sheets of hexagonally arrayed carbon atoms having a thickness of a single carbon atom, referred to as graphene. The two-dimensional sheets of graphene may be rolled along various angles to provide the tubular structures of the carbon nanotubes. The two-dimensional sheets of graphene may also form carbon nanotubes with tubular structures having varying diameters. The angles in which the two-dimensional sheets of graphene are rolled and/or the diameter of the resulting tubular structure may determine one or more properties of the carbon nanotubes. For example, the angle in which the two-dimensional sheets of graphene are rolled may determine a chirality or type of the carbon nanotubes that are formed, which may determine, at least in part, whether the carbon nanotubes exhibit metallic or semiconductive properties.

In at least one embodiment, the hollow, tubular structure of the carbon nanotubes may include straight or bent sidewalls and the ends of the tubular structure may be open and/or closed. The carbon nanotubes may be single-walled nanotubes, double-walled nanotubes, and/or multi-walled nanotubes. The carbon nanotubes may be purified carbon nanotubes and/or crude carbon nanotubes (e.g., as synthesized). The carbon nanotubes may be bare or pristine carbon nanotubes and/or functionalized carbon nanotubes. Pristine carbon nanotubes may include carbon nanotubes that have not undergone any surface modifications and/or treatments subsequent to synthesis and/or purification thereof. Functionalized carbon nanotubes may include carbon nanotubes that may have undergone a surface modification and/or treatment such that one or more functional chemical moiety or moieties are associated therewith. For example, functionalized carbon nanotubes may include carbon nanotubes that have undergone a surface modification treatment such that one or more functional chemical moiety or moieties are associated with the sidewalls (i.e., inner and/or outer sidewalls) and/or the ends of the hollow, tubular structure. In at least one embodiment, the carbon nanotubes may be functionalized with the chemical moiety or moieties to modify one or more properties (e.g., mechanical, thermal, electrical, solubility, etc.) thereof.

In at least one embodiment, the carbon nanotubes may include carbon nanotube composites. The carbon nanotube composites may be or include carbon nanotubes coupled with and/or combined with (e.g., chemically and/or physically) at least one other element or constituent. Illustrative carbon nanotube composites may include, but are not limited to, metal-oxide/carbon nanotube composites, metal/carbon nanotube composites, and the like. In at least one embodiment, the carbon nanotube composites may include carbon nanotubes coupled with and/or combined with one or more magnetic elements or constituents, which may induce and/or enhance the magnetic properties or magnetic susceptibility thereof. In another embodiment, the carbon nanotube composites may include carbon nanotubes coupled with and/or combined with one or more dispersants, which may facilitate and/or enhance the dispersion thereof.

In at least one embodiment, the carbon nanotubes may be aligned or substantially aligned with one another within the matrix material of the carbon nanotube composites. For example, the carbon nanotubes may be dispersed in the matrix material such that a longitudinal axis of the tubular structure of the carbon nanotubes may be aligned or substantially aligned with one another. The alignment or substantial alignment of the carbon nanotubes along the respective longitudinal axes thereof may provide the carbon nanotube composites with one or more anisotropic properties. For example, the carbon nanotubes may have increased mechanical strength along the longitudinal axis of the tubular structure as compared to the mechanical strength normal or perpendicular to the longitudinal axis. Accordingly, the alignment or substantial alignment of the carbon nanotubes along the respective longitudinal axes thereof may provide the carbon nanotube composites with increased mechanical strength in the direction in which the longitudinal axis of the carbon nanotubes are aligned as compared to the direction normal to the longitudinal axis of the carbon nanotubes. In another embodiment, the carbon nanotubes may not be aligned or substantially aligned with one another within the matrix material of the carbon nanotube composites. Instead, the carbon nanotubes may be randomly dispersed and/or entangled with one another in the matrix material. The random dispersion of the carbon nanotubes in the matrix material may provide the carbon nanotube composites with increased mechanical strength as compared to the metal material alone.

In at least one embodiment, the sidewalls and/or the ends of the carbon nanotubes may include one or more structural defects. For example, the sidewalls and/or ends of the carbon nanotubes may include pentagonal and/or heptagonal arrays of carbon atoms, as opposed to hexagonal arrays of carbon atoms. In another example, the carbon nanotubes may also include one or more vacancies in the sidewalls and/or the ends thereof. The structural defects in the carbon nanotubes may modify one or more properties thereof. For example, the structural defects may induce magnetic properties within the carbon nanotubes. In another example, the structural defects may increase or decrease the susceptibility of the carbon nanotubes to interact (e.g., chemically and/or physically) with the matrix material and/or additional elements or constituents. In at least one embodiment, the degree or magnitude in which the properties of the carbon nanotubes may be modified may be determined, at least in part, by the number or amount of structural defects present, referred to as a defect density. For example, carbon nanotubes with a greater defect density may exhibit increased susceptibility to interactions as compared to carbon nanotubes with a lower defect density.

The carbon nanotubes may have magnetic properties and/or exhibit magnetic susceptibility. In at least one embodiment, the carbon nanotubes may be induced into a magnetic state. For example, the carbon nanotubes may be subjected to a magnetic field to induce the carbon nanotubes into the magnetic state. In at least one embodiment, the magnetic susceptibility of the carbon nanotubes may be determined, at least in part, by the type of carbon nanotubes utilized. For example, metallic carbon nanotubes may exhibit greater magnetic susceptibility as compared to semi-conductive carbon nanotubes. In another example, the carbon nanotubes may be functionalized and/or treated to provide functionalized carbon nanotubes and/or carbon nanotube composites having magnetic properties and/or exhibiting magnetic susceptibility. In at least one embodiment, the magnetic properties and/or magnetic susceptibility of the carbon nanotubes may provide a method for aligning or substantially aligning the carbon nanotubes within the matrix material of the carbon nanotube composites. For example, a magnetic field may be applied to the carbon nanotubes in one or more steps of fabricating the carbon nanotube composites to induce alignment or substantial alignment of the carbon nanotubes along the longitudinal axis of the tubular structure.

The carbon nanotube composites may be fabricated by contacting or combining the matrix material with the carbon nanotubes. In at least one embodiment, the matrix material may be or include one or more metals and/or alloys. The metals may be combined with the carbon nanotubes to provide a metals-based carbon nanotube composite. Similarly, the alloys may be combined with the carbon nanotubes to provide an alloy-based carbon nanotube composite. Illustrative metals and/or alloys may include, but are not limited to, INCONEL®, aluminum, an aluminum alloy, titanium, a titanium alloy, stainless steel, carbon steel, cast iron, or the like, or any combination thereof. The metals and/or alloys combined with the carbon nanotubes may be provided as a solid (e.g., powdered metal) or as a liquid (e.g., molten solution). The metals and/or alloys utilized in the matrix material may be determined, at least in part, by a melting point thereof. For example, subjecting the carbon nanotubes to elevated temperatures may degrade or damage the carbon nanotubes. As such, the matrix material may include the metals and/or alloys having a melting point lower than the temperatures sufficient to degrade the carbon nanotubes. In at least one embodiment, the carbon nanotubes may be functionalized and/or treated to increase the melting point thereof. Accordingly, functionalized carbon nanotubes and/or carbon nanotube composites may be combined with the molten solution without degrading or damaging the carbon nanotubes.

In at least one embodiment, the metals and/or alloys combined with the carbon nanotubes may be determined, at least in part, by one or more reactions at the interfacing surfaces between the carbon nanotubes and the matrix material (e.g., molten solution). For example, combining the carbon nanotubes with the molten solution may result in the formation of one or more reaction products (e.g., chemical reaction products) at the interfacing surfaces therebetween. The formation of the reaction products may increase or decrease the interaction or bonding between the carbon nanotubes and the matrix materials. Increasing the bonding between the matrix materials and the carbon nanotubes may allow any mechanical stresses or forces applied to the matrix materials to be transferred to the carbon nanotubes, thereby providing carbon nanotube composites with increased mechanical strength. The formation of the reaction product at the interfacing surfaces may also increase wetting of the molten solution about the tubular structure of the carbon nanotubes, which may increase the bonding strength between the carbon nanotubes and the matrix materials. In at least one embodiment, the carbon nanotubes may be functionalized and/or treated to provide functionalized carbon nanotubes and/or carbon nanotube composites that may increase the formation of the reaction products at the interfacing surfaces, thereby increasing the wetting of the molten solution about the tubular structure of the carbon nanotubes.

In at least one embodiment, the carbon nanotubes may provide or form anchors between grains of the metals and/or alloys of the carbon nanotube composites. For example, the carbon nanotubes in the carbon nanotube composites may cross grain boundaries of the metals and/or alloys to thereby increase the toughness of the carbon nanotube composites as compared to the metals and/or alloys alone.

To fabricate the carbon nanotube composites having the metal and/or alloy as the matrix material, the carbon nanotubes may be combined with the molten solution via one or more high temperature metal processing operations. Illustrative high temperature metal processing operations may include, but are not limited to, a foundry process, and the carbon nanotubes may be combined with the molten solution during one or more steps of the foundry process. For example, the carbon nanotubes may be combined with the molten solution in the casting and/or forging steps of the foundry process. In at least one embodiment, the carbon nanotubes may be combined with the molten solution in one or more melting furnaces, ladles, metal treatment boxes, or any combination thereof. Illustrative furnaces may include, but are not limited to, electric induction furnaces, cupolas, electric arc furnaces, rotary furnaces, gas-fired furnaces, such as gas-fired shaft and resistance furnaces, gas and oil-fired crucible furnaces, or any combination thereof. Illustrative ladles may include, but are not limited to, one or more treatment ladles, transfer ladles, pouring ladles, pouring boxes, or any combination thereof.

In at least one embodiment, contacting or combining the molten solution with the carbon nanotubes may result in a turbulent reaction that may disperse the carbon nanotubes within the molten solution, thereby increasing the distribution or homogeneity of the carbon nanotubes within the molten mixture. In another embodiment, the carbon nanotubes may be combined with the molten solution, and the resulting molten mixture may be subjected to one or more mechanical processes to increase the distribution or homogeneity of the carbon nanotubes within the molten mixture. The molten mixture may be transferred to a mold and subsequently cooled or solidified therein to provide the carbon nanotube composites.

In at least one embodiment, a centrifugal casting process may be utilized to fabricate the carbon nanotube composites. For example, the molten mixture having the carbon nanotubes dispersed therein may be transferred to a rotating mold and subsequently cooled or solidified therein to provide the carbon nanotube composites. Centrifugal forces resulting from the rotation of the mold may direct the molten mixture toward an inner surface of the mold. In at least one embodiment, the rotation of the mold may result in a directional flow of the molten mixture along the inner surface thereof. For example, the molten mixture may flow in the direction in which the mold is rotated. In at least one embodiment, the flow of the molten mixture may align and/or substantially align the carbon nanotubes with one another. For example, the flow of the molten mixture may cause the carbon nanotubes to migrate or rotate such that the longitudinal axes thereof are aligned with the directional flow of the molten mixture. Accordingly, the subsequent cooling or solidification of the molten solution in the rotating mold may provide the carbon nanotube composites having aligned or substantially aligned carbon nanotubes dispersed therein. In at least one embodiment, the centrifugal forces may also cause the carbon nanotubes to migrate in a direction radial to the direction of rotation of the mold. The migration of the carbon nanotubes may provide a method of concentrating the carbon nanotubes at a predetermined portion or portions of the resulting carbon nanotube composites. For example, the molten mixture may be rotated such that the carbon nanotubes are concentrated about an inner or outer portion of the resulting carbon nanotube composites.

In at least one embodiment, the carbon nanotubes may be combined with the powdered metals in one or more heating and pressing processes to provide the carbon nanotube composites. For example, the carbon nanotubes may be mixed or dispersed with the powdered metals via one or more mechanical processes, and the mixture may be heated and pressed in a sintering process to provide the carbon nanotube composites. The sintering process may cause the matrix material (e.g., powdered metal) to melt and bind with the carbon nanotubes to provide the carbon nanotube composites. In another embodiment, the carbon nanotube composites may be fabricated in a first process or method, and the resulting carbon nanotube composites from the first process may be subsequently heated and pressed in the sintering process. The subsequent heating and pressing of the carbon nanotube composites in the sintering process may increase the density, strength, toughness, and/or hardness of the carbon nanotube composites. Illustrative sintering processes may include, but are not limited to, vacuum sintering, hot isostatic pressing (HIP), or any combination thereof.

In at least one embodiment, the matrix material may be or include one or more polymeric materials or polymers. The polymers may be combined with the carbon nanotubes to provide a polymer-based carbon nanotube composite. The polymers may be or include any polymers known in the art. For example, the polymers may be polymers having increased mechanical properties, such as elasticity and tensile modulus, when combined with the carbon nanotubes. The polymers may exhibit various properties, such as electrical conductivity and/or elasticity.

In at least one embodiment, the polymers may be or include functional polymers. Illustrative functional polymers may include, but are not limited to, heat resistant polymers, conductive polymers, piezoelectric polymers, photosensitive polymers, or any combination thereof. Illustrative heat resistant polymers may include, but are not limited to, polyphenylene sulfides, polysulfones, polybenzimidazoles, polyphosphazenes, polythiazyls, or the like. Illustrative conductive polymers may include, but are not limited to, polythiophenes, polyacetylenes, polypyrroles, polyphenylenes, polythienyl vinyldenes, polyphenylene sulfides, polyanilines, polyparaphenylene vinylenes, polyparaphenylenes, polyfluorenes, polythiophene vinylenes, or the like. Illustrative piezoelectric polymers may include, but are not limited to, poly(vinylidene fluoride) or the like. Illustrative photosensitive polymers may include, but are not limited to, polyvinyl cinnamate, an acryl-based polymer, or the like.

The polymers may also be or include, but are not limited to, polyolefin-based polymers, acryl-based polymers, polyurethane-based polymers, ether-based polymers, polyester-based polymers, polyamide-based polymers, formaldehyde-based polymers, silicon-based polymers, or any combination thereof. For example, the polymers may include, but are not limited to, poly(ether ether ketone) (PEEK), TORLON®, polyamide-imides, polyethylene (PE), polyvinyl fluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), poly(1-butene), poly(4-methylpentene), polystyrene, polyvinyl pyridine, polybutadiene, polyisoprene, polychloroprene, styrene-acrylonitrile copolymer, acrylonitrile-butadiene-styrene terpolymer, ethylene-methacrylic acid copolymer, styrene-butadiene rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resins, polyphenylene oxide, polyethylene terephthalate, polybutylene terephthalate, polydihydroxymethylcyclohexyl terephthalate, cellulose esters, polycarbonate, polyamide, polyimide, any copolymers thereof, or any combination thereof. It may be appreciated that the polymers may include any combination of at least two or more of the foregoing.

In at least one embodiment, the polymer may be or include an elastomer, synthetic rubber, or any combination thereof. Illustrative elastomeric materials and synthetic rubbers may include, but are not limited to, VITON®, nitrile, polybutadiene, acrylonitrile, polyisoprene, neoprene, butyl rubber, chloroprene, polysiloxane, styrene-butadiene rubber, hydrin rubber, silicone rubber, ethylene-propylene-diene terpolymers, any copolymers thereof, or any combination thereof.

In at least one embodiment, the carbon nanotubes and the polymers may interact physically with one another. For example, the carbon nanotubes may be physically mixed and/or dispersed within the polymers. In another embodiment, the carbon nanotubes and the polymers may interact chemically with one another. For example, the polymers may chemically react or bond with the functional groups of the carbon nanotubes, the structural defects of the carbon nanotubes, or the like. In at least one embodiment, the polymers contacted or combined with the carbon nanotubes may be determined, at least in part, by one or more reactions at the interfacing surfaces between the carbon nanotubes and the polymers. For example, combining the carbon nanotubes with the polymers (e.g., polymer solution) may result in the formation of one or more reaction products (e.g., chemical reaction products) at the interfacing surfaces therebetween. The formation of the reaction products may increase or decrease the interaction or bonding between the carbon nanotubes and the polymers. Increasing the bonding between the polymers and the carbon nanotubes may allow any mechanical stresses or forces applied to the polymers to be transferred to the carbon nanotubes, thereby providing carbon nanotube composites with increased mechanical strength. The formation of the reaction product at the interfacing surfaces may also increase wetting of the polymers about the tubular structure of the carbon nanotubes, which may increase the bonding strength between the carbon nanotubes and the polymers. In at least one embodiment, the carbon nanotubes may be functionalized and/or treated to provide functionalized carbon nanotubes and/or carbon nanotube composites that may increase the formation of the reaction products at the interfacing surfaces, thereby increasing the wetting of the polymers about the tubular structure of the carbon nanotubes.

In at least one embodiment, the polymers and/or the carbon nanotubes may include one or more additives. Illustrative additives may include, but are not limited to, a solvent, a coupling agent, a filler, a wetting agent, or the like, or any combination thereof. The additives may be combined with the polymers and/or the carbon nanotubes to control and/or modify one or more properties of the polymers, the carbon nanotubes, and/or the carbon nanotube composites. For example, the solvent may be combined with the polymers to improve the dispersion and/or miscibility of the polymers and/or the carbon nanotubes combined therewith in the carbon nanotube composites. The solvent may also be combined with the polymers to control or regulate the viscosity and/or flow of the resulting carbon nanotube composites. Controlling the viscosity and/or the flow of the carbon nanotube composites may facilitate the manufacture of the turbomachines and/or components thereof. For example, the viscosity and/or flow of the carbon nanotube composites may determine, at least in part, the ease in which the carbon nanotube composites may be incorporated into one or more industrial scale manufacturing or fabrication processes. Illustrative solvents may include, but are not limited to, dimethylformamide (DMF), 4-hydroxy-4-methyl-2-pentanone, ethylene glycol monoethyl ether, 2-methoxymethanol, methoxy propyl acetate, ethyl-3-ethoxypropionate, cyclohexanone, or the like, or any combination thereof. It may be appreciated that the solvent may be combined with the polymers before, during, and/or after combining the polymers with the carbon nanotubes.

In at least one embodiment, the coupling agent may be any material capable of providing and/or enhancing the toughness of the polymer, the carbon nanotubes, and/or the carbon nanotube composites. Illustrative coupling agents may include, but are not limited to, aminopropyltriethoxysilane, phenylaminopropylmethoxysilane, ureidopropyltriethoxysilane, glycidoxypropyltrimethoxysilane, isocyanatopropyltriethoxysilane, isopropyltriisostearoyltitanate, acetoalkoxyaluminum diisopropoxide, or the like, or any combination thereof. In at least one embodiment, the filler may be any material capable of providing and/or enhancing the mechanical properties of the polymer, the carbon nanotubes, and/or the carbon nanotube composites. Illustrative fillers may include, but are not limited to, glass (e.g., beads or fibers), carbon black, graphite, or the like, or any combination thereof. In at least one embodiment, the wetting agent may be any material capable of providing and/or enhancing a wettability of the polymer, the carbon nanotubes, and/or the carbon nanotube composites. Illustrative wetting agents may include, but are not limited to, glycerine, a sorbitol solution, propylene glycol, polyethylene glycol, an amorphous sorbitol solution, or the like, or any combination thereof.

To fabricate the carbon nanotube composites having the polymers as the matrix material, the carbon nanotubes may be contacted or combined with the polymers. The polymers combined with the carbon nanotubes may be provided as a solid (e.g., powdered polymer) and/or as a liquid (e.g., polymer solution). The polymers and the carbon nanotubes may be combined with one another via any well-known system or method. For example, combining the polymers and the carbon nanotubes with one another may include solvating the polymer in a solvent to provide a polymer solution, and combining the polymer solution with the carbon nanotubes. In another example, the polymer may be solvated in a solvent having the carbon nanotubes already dispersed therein. In another example, a melted or softened polymer may be combined with the carbon nanotubes at high shear. The combined polymers and carbon nanotubes may be subsequently processed to provide the carbon nanotube composites in various forms. For example, the combined polymers and carbon nanotubes may be extruded and/or injection molded to provide the carbon nanotube composites having various forms. In at least one embodiment, the carbon nanotube composites having the polymer as the matrix material may be subjected to one or more curing processes.

The carbon nanotube composites described herein may be used in the fabrication of any system, device, apparatus, assembly, or components thereof that may utilize metals, alloys, and/or polymers. For example, the carbon nanotube composites may be used in the fabrication of turbomachines and/or components thereof. Illustrative turbomachines may include, but are not limited to, single- or multi-stage centrifugal compressors, single- or multi-stage steam turbines, single- or multi-stage gas turbines, single- or multi-stage expanders, single- or multi-stage reciprocating compressors, rotating separators, supersonic compressors, gas engines, diesel engines, or the like. Illustrative components that may be fabricated from the carbon nanotube composites may include, but are not limited to, impellers, blades, vanes, casings, diaphragms, stators, bearings, heads, heads, pistons, cylinders, rods, shafts, rotary shafts, sleeves, balance pistons, cross-heads, piston rods, connecting rods, crankcases, engine blocks, turbine discs, shroud rings, nose cones, inlet cases, exhaust cases, intermediate casings, valve blocks, nozzle blocks, inlet nozzles, discharge or outlet nozzles, inlet walls, division walls, discharge walls, labyrinth seals, O-rings, mechanical fasteners, or the like.

In one or more embodiments, the carbon nanotube composites described herein may be subsequently processed to fabricate the turbomachine and/or components thereof. For example, as previously described, the polymer-based carbon nanotube composites may be subsequently processed via an extrusion and/or injection molding process to provide the carbon nanotube composites having various shapes or forms, such as the forms of the turbomachine components. Additionally, the carbon nanotube composites may also be subjected to one or more machining processes to fabricate the turbomachine components. Illustrative machining processes may include, but are not limited to, drilling, milling, cutting, grinding, or the like, or any combination thereof.

In at least one embodiment, the carbon nanotube composites may be formed concurrently with the fabrication of the turbomachine and/or components thereof. For example, as previously discussed, forming the metal-based carbon nanotube composites may include transferring the molten mixture of the carbon nanotubes and the metal into a mold and subsequently cooling or solidifying the mold to provide the carbon nanotube composites. In at least one embodiment, the mold may be in the form of the turbomachine component. In another embodiment, the mold may provide a carbon nanotube composite blank that may be subsequently processed (e.g., machining process) to fabricate the turbomachine component.

The turbomachine and/or components thereof may also be fabricated via an additive manufacturing process or three-dimensional (3D) printing. Additive manufacturing may include utilizing a computer aided design (CAD) assembly to provide a geometry or digital design of the turbomachine component. The digital design may be used as a template or guide for a layering device (e.g., 3D printer) to fabricate the turbomachine component. The layering device may be or include any device capable of fabricating the turbomachine component from the digital design. For example, the layering device may include, but is not limited to, PROJET 1000®, PROJET 1500®, PROJET SD 3500®, ZPRINTER 350 or the like, which are all available from 3D Systems Corp. of Rock Hill, S.C.

It may be appreciated that the carbon nanotube composites described herein may exhibit improved mechanical properties as compared to the matrix materials alone. For example, the carbon nanotube composites may have increased wear resistance, tensile strength, toughness, hardness, flexibility, elasticity, thermal conductivity, or any combination thereof. It may be further appreciated that utilizing the carbon nanotube composites in the fabrication or manufacture of the turbomachines and/or components thereof may provide a method of increasing production and/or operating efficiencies of the turbomachines.

In at least one embodiment, the production from the turbomachines may be determined, at least in part, by the speed in which the components (e.g., impellers, blades, etc.) may be operated (e.g., rotated). For example, the production of the turbomachines may be determined by the speed in which the blades and/or the rotary shafts may be rotated. The speed in which the blades and/or the rotary shaft may be rotated may be limited or determined, at least in part, by the ability of the component to withstand mechanical stresses and/or strains associated with the rotation thereof. Accordingly, fabricating the components (e.g., blades, rotary shafts, etc.) from the carbon nanotube composites capable of withstanding increased mechanical stresses may allow the components to be driven at higher speeds, thereby increasing production.

In at least one embodiment, increasing the mechanical properties of the materials used to fabricate the turbomachine and/or components thereof may provide a method of reducing the relative dimensions (e.g., thickness, diameter, length, etc.) of the turbomachine and/or components thereof. Reducing the dimensions of the turbomachine and/or components thereof may reduce the mass thereof, thereby reducing the energy required to operate the turbomachine. Further, reducing the mass may also allow the turbomachines and/or components thereof to be operated at higher speeds, thereby increasing production in the turbomachines and/or decreasing the number of turbomachines necessary for production. Reducing the dimensions (e.g., thickness) of the components may also allow the turbomachines to be fabricated with a reduced overall axial length. For example, by reducing the thickness of the impellers, blades, division walls, inlet walls, or the like, or any combination thereof, the overall axial length of the turbomachines may be reduced. Reducing the overall axial length of the turbomachines may reduce bearing span, thereby improving rotordynamics thereof. Reducing the overall axial length may also allow the turbomachines to be fabricated with additional stages (e.g., impeller stages). Reducing the mass and/or increasing the mechanical properties of the components may allow the blades of the turbomachines to be fabricated with an increased length, thereby increasing the overall power output per stage of the turbomachines and/or reducing the number of stages of the turbomachines.

The FIGURE illustrates a flowchart of a method 100 for fabricating a turbomachine component, according to one or more embodiments. The method 100 may include contacting carbon nanotubes with a matrix material to form a metal-based carbon nanotube composite, where the matrix material may comprise a metal, as shown at 102. The method 100 may also include processing the metal-based carbon nanotube composite to fabricate the turbomachine component, as shown at 104.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A turbomachine component, comprising:
    a matrix material comprising a metal, the metal comprising a compound selected from the group consisting of titanium, a titanium alloy, stainless steel, carbon steel, cast iron, aluminum, aluminum alloy, and combinations thereof; and
    carbon nanotubes combined with the matrix material,
    wherein the carbon nanotubes are combined with a molten solution of the matrix material and a functional heat resistant polymer, the molten mixture of the matrix material being rotated such that the carbon nanotubes are concentrated about an inner or outer portion of a resulting carbon nanotube composite,
    wherein the carbon nanotubes are functionalized by way of the functional heat resistant polymer to sufficiently increase the melting point of the carbon nanotubes so that the carbon nanotubes are not subject to degradation when combined with the molten solution of the matrix material.

2. The turbomachine component of claim 1, wherein the carbon nanotubes are at least partially dispersed in the matrix material.

3. The turbomachine component of claim 1, wherein the turbomachine component is any one of: an impeller, a blade, a vane, a casing, a diaphragm, a stator, a bearing, a head, an inlet nozzle, an outlet nozzle, a piston, a cylinder, a rod, a rotary shaft, a piston rod, a connecting rod, a crankcase, an engine block, a turbine disc, a shroud ring, a nose cone, an inlet case, an exhaust case, an intermediate casing, a valve block, a nozzle block, an inlet wall, a division wall, a discharge wall, a labyrinth seal, an O-ring, or a mechanical fastener.

4. The turbomachine component of claim 1, further comprising a reaction product at an interfacing surface between the carbon nanotubes and the matrix material.

5. A method for fabricating a turbomachine component, comprising:
- combining carbon nanotubes with a functional heat resistant polymer;
- contacting the carbon nanotubes with a matrix material to form a carbon nanotube composite, the matrix material comprising a molten solution of a metal,
- wherein the functional heat resistant polymer is arranged to sufficiently increase the melting point of the carbon nanotubes so that the carbon nanotubes are not subject to degradation when contacted by the molten solution of the metal,
- the metal comprising a compound selected from the group consisting of titanium, a titanium alloy, stainless steel, carbon steel, cast iron, aluminum, aluminum alloy, and combinations thereof;
- utilizing a centrifugal casting process to fabricate the carbon nanotube composite; and
- processing the metal-based carbon nanotube composite to fabricate the turbomachine component.

6. The method of claim 5, further comprising functionalizing the carbon nanotubes such that one or more chemical moieties are associated therewith.

7. The method of claim 5, further comprising forming a reaction product at an interfacing surface between the carbon nanotubes and the matrix material.

8. The method of claim 7, wherein the reaction product formed at the interfacing surface between the carbon nanotubes and the matrix material increases wetting of the matrix material about the carbon nanotubes.

* * * * *